United States Patent [19]
Beausoleil et al.

[11] Patent Number: 5,463,754
[45] Date of Patent: Oct. 31, 1995

[54] SHARED DIRECT ACCESS STORAGE DEVICE FOR FIXED BLOCK ARCHITECTURE DEVICES

[75] Inventors: William F. Beausoleil, Hopewell Junction; Charles R. Berghorn, Pleasant Valley; John A. Hupcey, Poughkeepsie; Sandra J. Schlosser, Woodstock, all of N.Y.

[73] Assignee: International Business Machines Corporation, Armonk, N.Y.

[21] Appl. No.: 969,865

[22] Filed: Oct. 30, 1992

[51] Int. Cl.⁶ .................... G06F 13/00; G06F 12/00
[52] U.S. Cl. .................. 395/200.08; 395/600; 395/474; 364/DIG. 1; 364/245; 364/269.4; 364/283.1
[58] Field of Search .................... 395/200, 600, 395/425, 725; 364/DIG. 1

[56] References Cited

U.S. PATENT DOCUMENTS

| | | | |
|---|---|---|---|
| 4,207,609 | 6/1980 | Luiz et al. | 364/200 |
| 4,310,883 | 1/1982 | Clifton et al. | 364/200 |
| 4,464,713 | 8/1984 | Benhase et al. | 364/200 |
| 4,771,375 | 9/1988 | Beglin et al. | 364/200 |
| 4,969,120 | 11/1990 | Azevedo et al. | 364/900 |
| 4,987,533 | 1/1991 | Clark et al. | 364/200 |
| 5,206,939 | 4/1993 | Yanai et al. | 395/400 |
| 5,293,618 | 3/1994 | Tandai et al. | 395/650 |
| 5,305,448 | 4/1994 | Insalaco et al. | 395/425 |

Primary Examiner—Thomas G. Black
Assistant Examiner—Jean R. Homere
Attorney, Agent, or Firm—Bernard M. Goldman

[57] ABSTRACT

A shared fixed block architecture direct access storage system and method for use with a plurality of computer systems is described. The storage system includes a shared fixed block architecture direct access storage device with a plurality of shared files. A shared fixed block architecture control unit is coupled to the shared fixed block architecture direct access storage device and to the plurality of computer systems. The shared fixed block architecture control unit also includes a data unit responsible for moving data between a shared fixed block architecture direct access storage device in the computer systems, a SETL unit responsible for processing access requests and for creating control files corresponding to each shared file, and a heart beat unit responsible for updating the control files. The method of the present invention includes the steps of receiving an access request from one of the computers for access to a selected shared file; and if a control file corresponding to this selected file has not been previously created, then creating a control file corresponding to this selected file. The control file is read to determine if it contains a record indicating that another of the computer systems already has access to a selected file and whether that access is incompatible with the current access request. Finally, if either no other system currently has access to the requested file or if another system has access to the requested file which is not incompatible, then the access request is granted.

3 Claims, 3 Drawing Sheets

SHARED DIRECT ACCESS STORAGE DEVICE FOR FIXED BLOCK ARCHITECTURE DEVICES

DESCRIPTION

1. Technical Field

The invention relates to the sharing of computer disk storage devices between multiple computer systems. More particularly, the invention relates to a system and method for providing two or more computer systems with regulated access to a shared disk storage device which utilizes fixed block architecture.

2. Background Art

Direct access storage devices (DASDs), such as hard disk drives, typically fall into two classifications. The first classification is count key data (CKD) direct access devices. The second classification is fixed block architecture (FBA) direct access storage devices.

CKD direct access storage devices can be differentiated from FBA devices by the manner in which data is accessed from the device. In a CKD device, individual records or information are accessed through the use of an address which uniquely identifies the physical location of the record within the device.

The information is accessed from an FBA device by specifying a relative block number. The FBA device itself then converts that relative block number into the actual physical location of the requested data. When an FBA device is manufactured, the storage media is physically divided into fixed memory locations.

In the past multiple users typically worked on a single computer system under the control of a single operating system. It was easy for users to share data in this type of environment, because the operating system could control all the users' access to the data and insure that they all had appropriate access while maintaining data integrity.

As computer system costs have decreased, it has become advantageous to give each user his own system. Users still need to share data, but a single operating system is no longer in control. What is needed is a way for the separate operating systems to insure that users do not acquire conflicting access to the shared data and open the door to possible data corruption.

This need has also existed to some extent for very large (main frame) systems. However such systems typically use count key data (CKD) direct access storage devices, have trained operators to monitor the system, and only a few systems (typically up to 16) can share data at one time.

Therefor what is needed is a system that can support Fixed Block Architecture (FBA) DASD, does not require monitoring by trained operators, and which can accommodate more than 16 systems. These requirements encompass the needs of a typical workstation LAN (local area network) environment such as the Personal/370 (P/370) processor (available from IBM Corporation of Armonk, N.Y.) operating in a LAN.

DISCLOSURE OF THE INVENTION

The present invention overcomes the deficiencies of past systems by providing a shared fixed block architecture direct access storage system for use with a plurality of computer systems. The shared fixed block architecture direct access storage device includes a fixed block architecture direct access storage device which includes a plurality of shared files. A control means is coupled to the fixed block architecture direct access storage device and it is also coupled to the plurality of computer systems. The control means includes a means for creating a plurality of shared DASD facility (SDF) lock files, one of the plurality of control files corresponding to each one of the plurality of shared files. The control means also includes a means for storing access information to and retrieving access information from the plurality of control files. A means for controlling access to the plurality of shared files according to the information stored in a plurality of control files is also included as part of the control means.

Another aspect of the present invention is directed to a method for sharing files between a plurality of computers when the files are stored on a shared fixed block architecture direct access storage device. The method includes the steps of first receiving an access (link) request from one of the plurality of computers for access to a selected shared file. If a control file corresponding to the selected shared file has not been previously created, then a control file corresponding to this selected shared file is created. The control file is read to determine if it contains a record which indicates that another of the plurality of computers has access to the selected shared file and whether that access is incompatible with the present access request. The computer which requested access is then granted that access if no record in the control file indicates that another of the plurality of computers has an incompatible access to the selected shared file.

The foregoing and other objects, features and advantages of the invention will be apparent from the following more particular description of a preferred embodiments of the invention, as illustrated in the accompanying drawings.

BEST MODE FOR CARRYING OUT THE INVENTION

Figure 1:
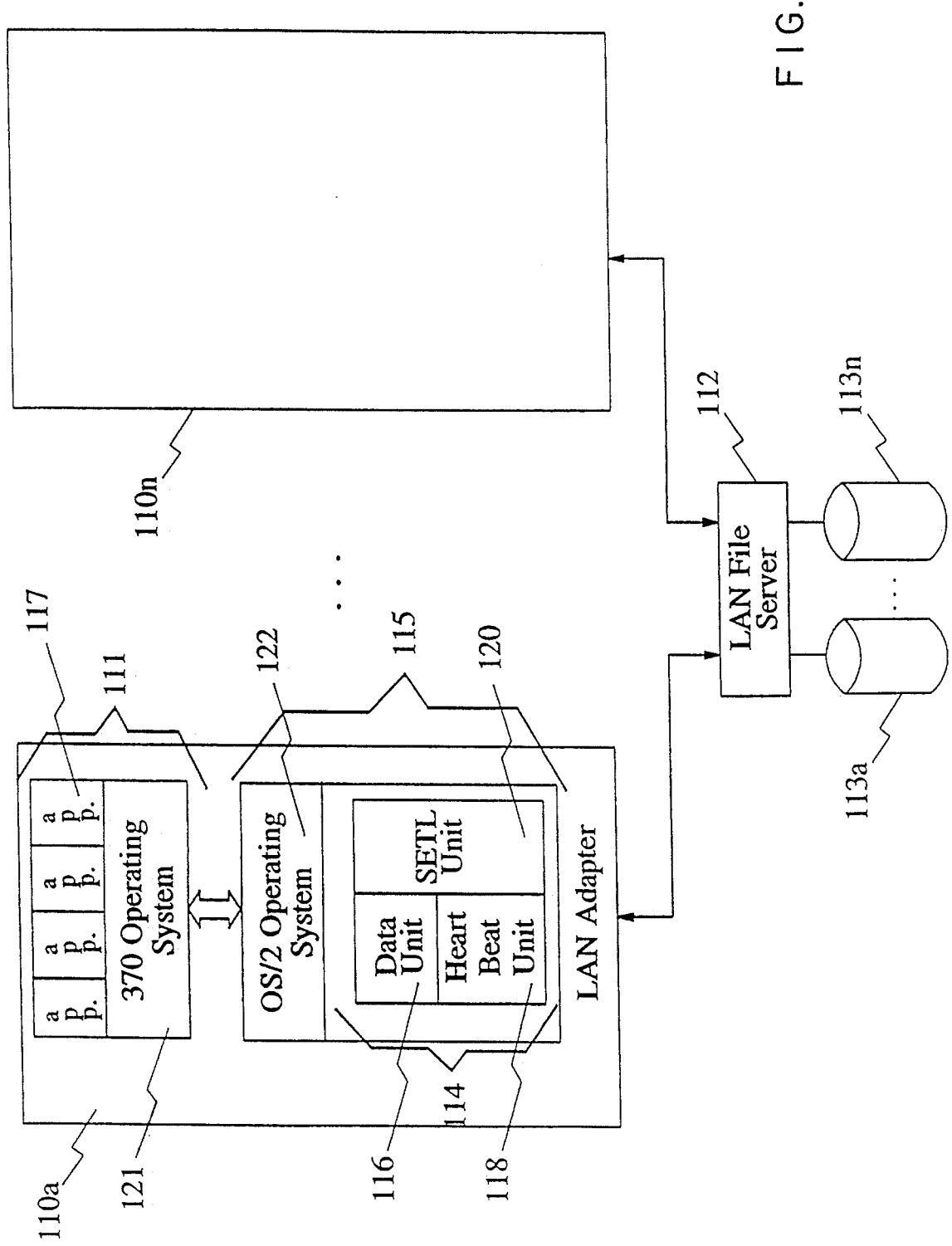
FIG. 1 is a block diagram of a system incorporating a preferred embodiment of the present invention.

FIG. 1 is a block diagram of a preferred structure for implementing the present invention. FIG. 1 represents a network of systems (workstations) 110a through 110n (referred to generically as 110). The systems are preferably IBM P/370 workstations which are comprised of an IBM microchannel PS/2 personal computer 115 operating with the OS/2 operating system 122 and the Personal/370 microchannel adapter card 111 which contain a 370 system and associated memory. The 370 system 111 includes an operating system 121 and application programs 117.

The systems 110 are configured in a local area network (LAN) which includes a LAN file server 112. The LAN and the associated LAN file server are preferably the NetWare 386® available from Novell Corporation of Utah or, alternatively, the OS/2 LAN server from IBM Corporation of New York. The components of the LAN, including the software and the LAN file server, are preferably typical off the shelf components with no modifications necessary for use as a part of the present invention. The LAN file server includes one or more hard disk drives 113a through 113n.

The files on these hard disk drives simulate FBA DASD devices to the P/370 workstations.

Preferably, each of the systems 110 on the LAN is an IBM Personal/370 (P/370) workstation. The P/370 emulates FBA DASD devices as DOS or OS/2 files. Groups of these files are referred to as volumes or devices and may be easily located on a file server in a LAN environment such that each of these volumes appears as an FBA DASD device and can then be accessed by each of the P/370 workstations on the LAN.

Block 114 of FIG. 1 represents software, which emulates a fixed block architecture control unit, running in the PC portion 115 of the system 110. The emulated fixed block architecture control unit 114 appears to the 370 system as a true fixed block architecture controller. The controller being emulated is preferably an IBM 3880 controlling an IBM 3370 disk drive (an FBA device). Therefore, the changes which need to be made to the operating system of the 370 system are minimal.

In a preferred embodiment of the present invention, the operating system 121 for the 370 system 111 utilizes the IBM VM/ESA operating system which is modified to include two additional channel control words (CCWs) discussed below. The operating system of the 370 processor is more fully described in IBM publication no. GA22-7000, "The System/370 Principles of Operation," the disclosure of which is incorporated herein by reference.

In general, the FBA DASD is implemented using DOS or OS/2 files. This allows the volumes of these files to be easily located on a file server such as the NetWare 386® or OS/2 LAN server. Each volume which is to be shared among the workstations on the network appears to each workstation as a shared volume. Each of the shared volumes has a separate file (the shared DASD facility (SDF) lock file) which is located in a subdirectory of the directory that contains the actual shared data file. For example, if the shared volume is Main:/First/Exempl.1, the SDF lock file is maintained in Main:/First/SDF/Exempl.1. All tracking and access control of the shared volume is done through the SDF lock file. Access to the SDF lock file is serialized by the file server in the normal manner.

Each SDF lock file consists of a master heart beat count (MCNT), map records and an end of file marker. Each system accessing the shared volume will have at least one map record in the SDF lock file. A map record consists of a system identification which identifies the system accessing the shared volume, a starting block or cylinder number, the number of cylinders or blocks accessed (the extent), a link flag indicating the access status of that system for this volume (read, write, none), a status flag indicating whether the system holding the access link is active (up) or inactive (down), and a heart beat count (HCNT). A system would have one map record for each extent of data.

The first of the two new CCWs, called SETL, is in the form of a write command which is sent to the FBA control unit 114. The SETL CCW contains data as follows: system name, starting block or cylinder number, extent (the number of blocks to be locked), access type and request type. This information identifies the area of the disk (the FBA DASD device) to be locked (or unlocked). In the VM operating system, this area is referred to as a "mini-disk". The mini-disk is the basic unit of DASD storage given to a VM end user. A mini-disk contains the set of files that the end user gets access to all at once.

Accessing of the volumes shared by the systems 110 on the LAN can be thought of in terms of systems establishing and severing links with a volume. The types of links correspond to those in the VM "LINK" command which is documented in various VM publications, for example, IBM publication SC19-6211, "CP Command Reference," incorporated herein by reference. The types of links which can be established through the SETL CCW and the conditions which must be met in order for each type of link to be established are set forth below as the varieties of access types.

R—read if no other system has write access, otherwise no access.

RR—read regardless of write access (read link always granted).

W—write if no other system has access, otherwise no access.

WR—write if no other system has read or write access, otherwise read.

M—write if no other system has write access, otherwise no access.

MR—write if no other system has write access, otherwise read access.

MW—write access is granted regardless of other systems' access mode (even if other systems' have write access.

There are four varieties of request types, as follows:

CLEAR—clear the requesting system's access to all extents on the volume. This request is used during initialization of the 370 operating system or any time that a shared volume is attached to the operating system. This request type checks if the SDF lock file exists and creates an SDF lock file if it has not already been created. When the SDF lock file is created, the master heart beat count (MCNT) is set to zero. If the SDF lock file exists, this type of request clears all of the requesting system's map records in the SDF lock file. If the request is not for a shared DASD device, the request is rejected thereby notifying the system that the requested volume is a normal volume.

LOCK—This type of request locks the requesting system's access to one extent (blocks or area to be locked) on a volume. This type of request is used when a user desires access to a range of blocks on a shared volume. The request checks the link status on all other systems' map records and decides if the lock can be granted. If the lock can be granted, it updates the requesting system's access status on the map record to read or write.

UNLOCK—this request clears the requesting system's access to all extents on the volume. This request is used when a shared volume is detached from the requesting system or when the 370 operating system is terminated. It clears all of the requesting system's map records in the SDF lock file.

RESET—this request resets the requesting system's access to one extent on a volume. This request is used when a user changes the access to a range of blocks on a shared volume from write to read or from read to none or write to none. This request resets the requesting system's access status on the map record accordingly.

Because of the nature of the operation of the 370 system, the QSETL CCW must be the next CCW sent to the FBA controller 114 after the SETL CCW in order to return the completion status of the SETL CCW. The data returned on the QSETL CCW is an indication of whether the link was granted, the type of link (read or write) that was granted, a list of other systems that have links to the requested area, and the types of links (reads or writes) the other systems have.

Referring to FIG. 1, the FBA control unit 114 can now be explained in more detail. The FBA control unit 114 includes three components. The data unit 116 is the part of the control unit responsible for moving data between a system and the file server 110. The control unit maintains an internal table listing all of the FBA DASD for the system. Each time the system issues a SETL CLEAR or SETL UNLOCK request, SETL unit 120 of the control unit 114 sets a flag in the internal table to indicate whether the volume is shared. The SETL unit 120 is responsible for processing the SETL and QSETL CCWs. Every two minutes the heart beat unit 118 scans this table to update all the SDF lock files for the devices listed in the table.

The heart beat unit 118 is responsible for updating the SDF lock file heart beat records for its system. The heart beat unit 118 only updates lock the SDF lock file heart beat records for devices which appear on the internal table maintained by the SETL unit 120. If a system never tries to access a device, then there is no need for its heart beat unit 118 to update the SDF lock file heart beat record for that device. Also, when appropriate, the heart beat unit 18 updates the master heart beat in an SDF lock file as will be discussed in more detail below.

Figure 2:
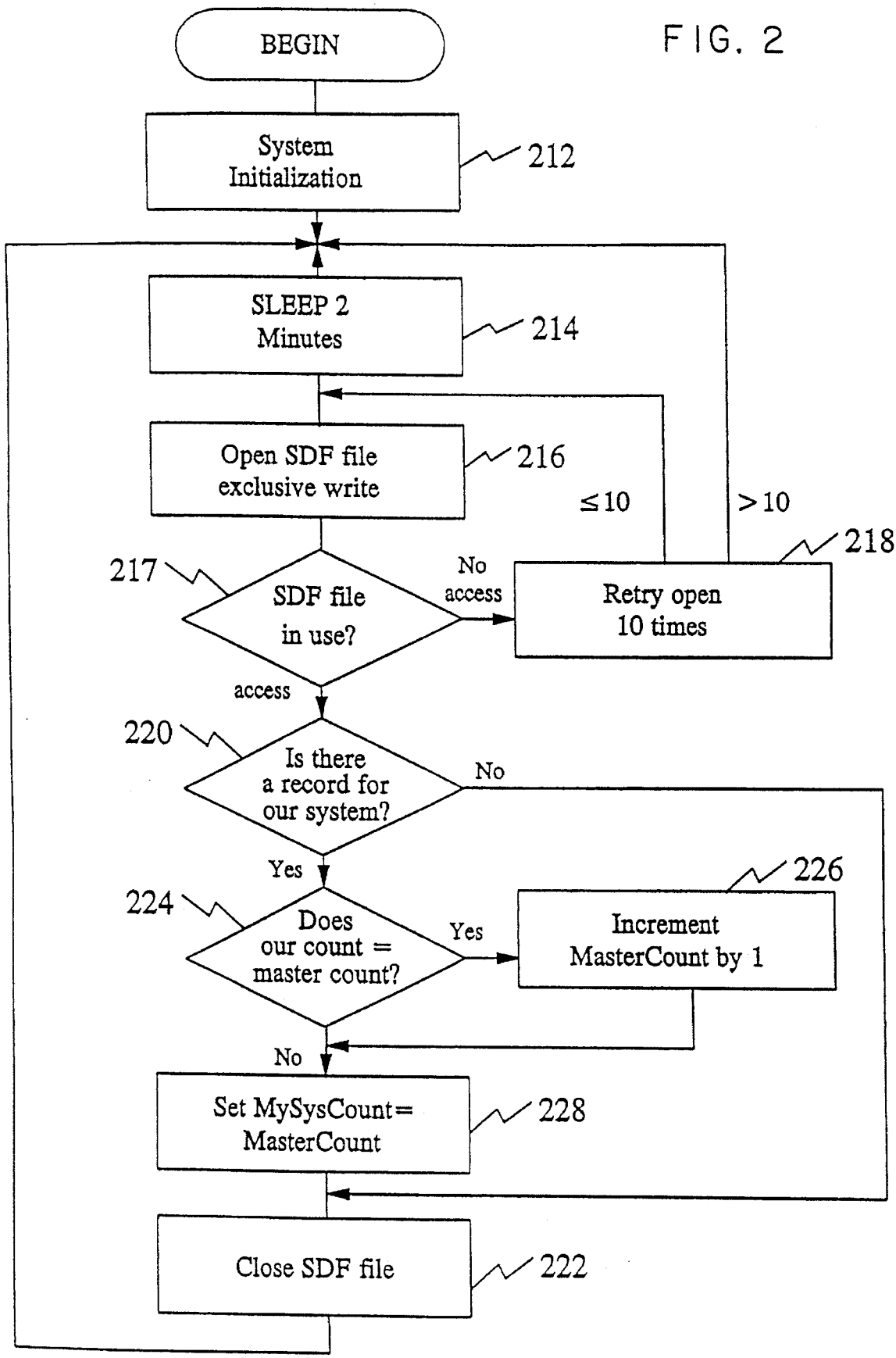
FIG. 2 is a flow chart which sets forth the operation of the heart beat unit in a preferred embodiment of the present invention.

FIG. 2 is a flow chart which sets forth the operation of the heart beat unit 118. Each FBA control unit 114 maintains a list of each shared FBA DASD volume for its system 110. The process depicted in FIG. 2 is followed for each of the shared volumes in that list.

Referring to FIG. 2, when the operating system for a system 110 is initialized, a SETL CLEAR CCW is issued for each FBA device as it is attached to the system as part of the system initialization represented by block 212. The SETL CLEAR CCW clears any map records belonging to this system for this shared device. In the map record the fields system identification, starting block, extent, link flag (none), the flag indicating that the system is up or down (up), and the heart beat count (HCNT) are all set to zero. The necessary exclusive write access (from the file server) to each SDF lock file is obtained by the control unit 114, the record initialization is performed, and then the file is released. The heart beat unit 118 then waits for two minutes as indicated by box 214 before continuing on with the process depicted in FIG. 2.

The first SDF lock file for the first shared volume in the list maintained in the control unit 114 is then attempted to be opened in an exclusive write mode 216. The exclusive write mode prevents all other systems from opening the same SDF lock file in a write mode. This system will attempt to open the SDF lock file in an exclusive write mode ten times before giving up and returning to sleep as indicated by box 218. After the SDF lock file has been accessed at 217, the SDF lock file is reviewed to determine if there is a map record for the system as depicted in box 220. Shared devices (volumes) may or may not be attached to any given system. If they are attached (in the control unit's list of shared devices), then they may or may not be linked (have a map record in the SDF lock file). The system's operating system 121 issues attach and detach commands for each DASD device. Attach results in a SETL CLEAR CCW being issued. Detach results in a SETL UNLOCK CCW being issued.

If there are no map records in the SDF lock file, then there are no links currently established between the system and the volume. The SDF lock file is then closed as depicted in box 222 and the system then returns to sleep for two minutes as depicted in box 214.

If the heart beat count (HCNT) in the map record that corresponds to the system is equal to the master heart beat count (MCNT) at the beginning of the open SDF lock file, then the MCNT is incremented by one as depicted in boxes 224 and 226. The system count for the system is then set equal to the master count of the SDF lock file as depicted in box 228. Alternatively, if HCNT does not equal MCNT, then HCNT is set equal to MCNT. In either event, the SDF lock file is then closed as depicted in box 222 and the process returns to sleep for two minutes as depicted in box 214.

The process depicted in FIG. 2 is carried out continuously for each shared volume listed in the FBA control unit 114.

Figure 3:
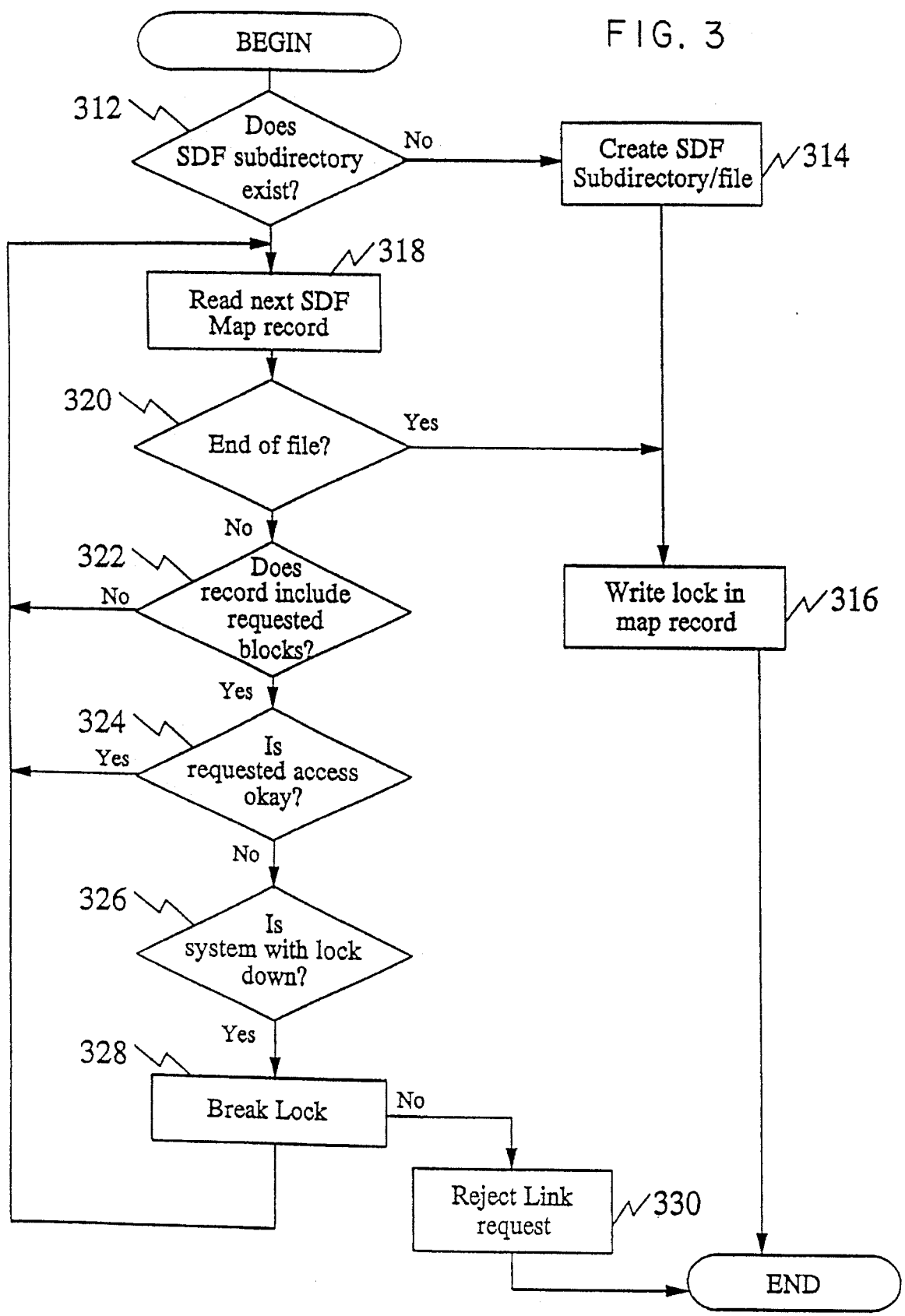
FIG. 3 is a flow chart which sets forth the process performed by the FBA control unit in a preferred embodiment of the present invention.

FIG. 3 is a flow chart which represents the steps performed by the FBA control unit 114 in response to a SETL LOCK CCW of the access type R. This is representative of any LOCK request. As discussed above, the SETL unit 120 within the FBA control unit 114 is responsible for responding to a SETL CCW. When the SETL unit 120 receives a SETL CCW, it first queries the LAN file server 112 to determine if an SDF subdirectory and SDF lock file exist for the volume identified in the particular SETL CCW. This step is represented by box 312. If an SDF subdirectory and/or file does not exist, the SETL unit 120 sends the appropriate commands to the LAN file server 112 to create the subdirectory and/or the file as shown in box 314. In that manner the SETL unit 120 provides a means for creating control files. If no SDF subdirectory and/or file exists, then no other system could have access to that volume because access to the volume can only be obtained by first making the appropriate entry in the SDF lock file. Of course the SDF lock file cannot exist without the appropriate SDF directory.

The SETL unit then writes a new map record 316 in the newly created SDF lock file. In that manner the SETL unit 120 provides a means for storing access information to the SDF lock files. The heart beat count (HCNT) in the new file is set to the master heart beat count (MCNT) in the SDF lock file. The requesting system has then established the requested link with the volume of interest. The SDF lock file has also been created showing that the requesting system has read access to the volume of interest.

If an SDF subdirectory and file previously exist, the first map record, if any, is read as indicated by box 318. If an end of file indicator is found at 320, the process writes a new map record at 316. Each time through this loop, the next map record is read at 318. In that manner the SETL unit 120 provides a means for retrieving (reading) access information from the SDF lock files. If all the map records have been read at 320 without encountering a lock conflict with another system at 322 and 324, then the requested link is allowed and a map record is written with the appropriate link value for the requesting system at 316. A lock controls access to a range of blocks within a device or volume. Two systems can have exclusive access to a different range of blocks in the same device.

If a map record indicates that another system has locked the blocks of interest, then the other system's type of access contained in the link flag is checked as indicated in FIG. 3 block 322. If the type of access is either read or none, then the requested is access allowed, and control returns to block 318 to read additional map records, if any. In the foregoing manner the SETL unit 120 provides a means for controlling access to the shared files according the information contained in the SDF lock files.

If the other system's access is of type write, then the process must also check to determine if that system is currently operating, the access is active (up), or nonoperating, the access is inactive (down).

If a map record indicates that a system has locked the blocks of interest, the SETL unit 120 then determines if the system with the lock is down at 326 (has not updated the HCNT which indicates that the system is out of communication with the device). If the master heart beat count (MCNT) for the SDF lock file is greater than the heart beat count (HCNT) plus two of the map record, then the system holding the lock is marked down and the lock is released (broken) at 328. If the system holding the conflicting lock is up, then the requested SETL link (access) request is rejected at 330.

To break the lock and mark a system down, the process sets the link flag in the map record of the system to be downed to "none" and its status flag to "down".

While a preferred embodiment of the invention has been set forth, there is modifications, alterations and changes may be made without departing from the spirit and scope of the present invention as defined in the appended claims.

Having thus described our invention, what we claim as new and desire to secure by Letters Patent is:

1. A shared fixed block architecture direct access storage system for use with a plurality of computer systems, comprising:

fixed block architecture direct access storage device having a plurality of shared files; and control unit means coupled to said fixed block architecture direct access storage device and to at least a first one of said plurality of computer systems, said control means including means for creating control files, associated with said plurality of shared files, means for storing access information to and retrieving access information from said control files, means for controlling access by the plurality of computer systems to said plurality of shared files according to said access information, means for creating and maintaining a table of selected ones of said plurality of shared files, heart beat means for writing heart beat data to said control files associated with each of said plurality of shared files in said table of shared files, said heart beat data indicating whether a first computer system of the plurality of computer systems is currently in communication with each of said plurality of shared files in said table of shared file, and means for terminating the access of the first computer system to a one of said plurality of shared files when a second computer system of said plurality of computer systems requests access to said one of said plurality of shared files and said first computer system is no longer in communication with said one of said plurality of shared files.

2. A shared fixed block architecture direct access storage system for use with a plurality of computer systems, as defined in claim 1, further comprising:

the fixed block architecture direct access storage device having a plurality of shared files and a corresponding plurality of SDF lock files, one SDF lock file being associated with each shared file and containing the status of all current accesses to the associated shared file; and a plurality of computer systems coupled to said fixed block architecture direct access storage device, each of said plurality of computer systems having associated with it a SETL (SET LINK) unit means for processing access requests, including SETL channel control words and QSETL (QUERY SET LINK) channel control words, from an associated computer system, including means, responsive to said QSETL channel control word, for reading an associated SDF (shared DASD facility) lock file to determine if requests from said associated computer system for access to a selected shared file conflict with a second computer system's access to said selected shared file, means, responsive to said SETL channel control word, for granting access to said selected shared file and writing data indicating the identity of said associated computer system and the type of access granted to said associated SDF lock file if said access does not conflict with said second computer system's access to said selected shared file, and means for reading said associated SDF lock file and determining if said second computer system is not active and terminating said second computer system's access to said selected shared data file if said second computer system is not active, a data unit means for moving data between said associated computer system and said shared files, and a heart beat unit means for periodically writing data which indicates that said associated computer system is active to each SDF lock file associated with a shared data file to which said associated computer system has access.

3. A method for sharing files between a plurality of computer systems coupled to a fixed block architecture direct access storage device on which the files to be shared are stored, the method comprising the steps of:

(1) receiving an access request from a first computer of the plurality of computers for access to a selected shared file stored on the shared fixed block architecture direct access storage device;

(2) creating a control file corresponding to said selected shared file if said control file corresponding to said selected shared file has not previously been created;

(3) reading said control file and determining if it contains a record indicating that a second computer of the plurality of computers has access to said selected shared file which is incompatible with said access request;

(3a) determining if said access of said second computer is active if a record in said control file indicates that said second computer has access to said selected shared file which is incompatible with said access request;

(3b) terminating the access of said second computer to said selected shared file if said access of said second computer is inactive;

(4) granting access to said first computer if no record in said control file indicates that said second computer has access to said selected shared file which is incompatible with said access request;

(4a) if access is granted to said first computer, then writing a record to said control file indicating the type of access granted and identifying said first computer which requested access to said selected shared filed, and (5) periodically accessing each control file associated with each shared file to which said second computer has access and writing heart beat data indicating that said access of said second computer is active.

\* \* \* \* \*